(12) United States Patent
Moehler et al.

(10) Patent No.: US 11,474,019 B2
(45) Date of Patent: Oct. 18, 2022

(54) METHOD AND APPARATUS FOR DETERMINING A CONCENTRATION OF AEROSOL PARTICLES IN A CARRIER GAS

(71) Applicant: Karlsruher Institut für Technologie, Karlsruhe (DE)

(72) Inventors: Ottmar Moehler, Karlsruhe (DE); Benjamin Murray, Horsforth (GB); Michael Adams, Hengoed (GB)

(73) Assignee: KARLSRUHER INSTITUT FUR TECHNOLOGIE, Karlsruhe (DE)

( * ) Notice: Subject to any disclaimer, the term of this patent is extended or adjusted under 35 U.S.C. 154(b) by 649 days.

(21) Appl. No.: 16/448,229

(22) Filed: Jun. 21, 2019

(65) Prior Publication Data

US 2020/0003671 A1    Jan. 2, 2020

(51) Int. Cl.
*G01N 15/06* (2006.01)
*H05B 3/46* (2006.01)
(Continued)

(52) U.S. Cl.
CPC ......... *G01N 15/065* (2013.01); *F17C 13/025* (2013.01); *G01N 25/142* (2013.01);
(Continued)

(58) Field of Classification Search
CPC .......... G01N 15/065; G01N 1/00; G01N 7/00; G01N 15/00; G01N 25/142;
(Continued)

(56) References Cited

U.S. PATENT DOCUMENTS

| 3,806,248 A | 4/1974 | Sinclair |
| 2003/0082825 A1* | 5/2003 | Lee ..................... G01N 15/0255 422/68.1 |
| 2006/0126056 A1 | 6/2006 | Roberts |

FOREIGN PATENT DOCUMENTS

| GB | 2 340 225 | 2/2000 |
| WO | WO 2018/081699 | 5/2018 |

OTHER PUBLICATIONS

DeMott, P. et al.: Comparative measurements of ambient atmospheric concentrations of ice nucleating particles using multiple immersion freezing methods and a continuous flow diffusion chamber, Atmos. Chem. Phys., 17, 11227-11245, 2017.
(Continued)

*Primary Examiner* — Benjamin R Schmitt
(74) *Attorney, Agent, or Firm* — Woodard, Emhardt, Henry, Reeves & Wagner, LLP (57) ABSTRACT

A method and apparatus for determining a concentration of aerosol particles in a carrier gas. The method comprises providing an aerosol having aerosol particles in a carrier gas comprising at least one condensable component; introducing at least part of the aerosol into a chamber of a pressure-rated vessel, wherein the chamber is delimited by at least one wall adjoining the chamber and set to a temperature which is above a saturation temperature of the at least one condensable component; subsequently removing part of the aerosol from the chamber, as a result of which a decrease in pressure in the chamber occurs, as a result of which the at least one condensable component condenses at least partly on the aerosol particles; and determining a concentration of aerosol particles in the carrier gas during removal of the part of the aerosol from the chamber.

12 Claims, 5 Drawing Sheets

(51) Int. Cl.
| | |
|---|---|
| *F17C 13/02* | (2006.01) |
| *G01N 25/14* | (2006.01) |
| *G01L 9/08* | (2006.01) |
| *G01K 7/16* | (2006.01) |
| *G01K 7/02* | (2021.01) |
| *G01L 9/12* | (2006.01) |
| *G01N 15/00* | (2006.01) |

(52) U.S. Cl.
CPC .............. *H05B 3/46* (2013.01); *F17C 13/026* (2013.01); *G01K 7/02* (2013.01); *G01K 7/16* (2013.01); *G01L 9/08* (2013.01); *G01L 9/12* (2013.01); *G01N 2015/0046* (2013.01); *G01N 2015/0693* (2013.01)

(58) Field of Classification Search
CPC ... G01N 2015/0046; G01N 2015/0693; G01N 2291/0253; F17C 13/025; F17C 13/026
See application file for complete search history.

(56) References Cited

OTHER PUBLICATIONS

DeMott, P. J. et al. (2011), Resurgence in Ice Nuclei Measurement Research, Bull. Am. Meteorol. Soc.. 92(12), 1623.

Hiranurna, N. et al. (2015), A comprehensive laboratory study on the immersion freezing behavior of illite NX particles: a comparison of 17 ice nucleation measurement techniques, Atmos. Chem. Phys., 15(5), 2489-2518.

Rogers, D. C. (1988), Development of a continuous flow thermal gradient diffusion chamber for ice nucleation studies, Atmos. Res., 22, 149-181.

Stetzer, 0. et al. (2008), The Zurich Ice Nucleation Chamber (Zinc)—A New Instrument to Investigate Atmospheric Ice Formation, Aerosol Sol. Tech, 42(1), 64-74.

* cited by examiner

METHOD AND APPARATUS FOR DETERMINING A CONCENTRATION OF AEROSOL PARTICLES IN A CARRIER GAS

FIELD OF THE INVENTION

The present invention relates to the field of process engineering and provides a method and an apparatus for determining a concentration of aerosol particles in a carrier gas. This invention can be suitable, in particular, for examination of atmospheric aerosols, in particular aerosol particles, but can also be used as aerosol particle detector in process gases or in clean air rooms. In addition, further fields of application are conceivable.

PRIOR ART

Various methods and apparatuses for determining a concentration of aerosol particles in a carrier gas are known from the prior art. Apart from the determination of a total number of aerosol particles in a carrier gas, a particular task can also be the measurement of ice-forming aerosol particles. For this purpose, methods in which the aerosol particles are collected over a prolonged period of time from hours to days and the aerosol particle concentration, in particular the concentration of ice-forming aerosol particles, is analyzed off-line are frequently employed.

Continuous flow diffusion chambers (CFDCs) as described by Rogers, D. C. (1988), *Development of a continuous flow thermal gradient diffusion chamber for ice nucleation studies*, Atmos. Res., 22, 149-181, or Stetzer, O., B. Baschek, F. Lüönd, and U. Lohmann (2008), *The Zurich Ice Nucleation Chamber (ZINC)—A New Instrument to Investigate Atmospheric Ice Formation*, Aerosol Sci. Tech, 42(1), 64-74, are frequently used for this purpose. An overview of continuous flow diffusion chambers may be found in the article by DeMott, P. J., O. Möhler, O. Stetzer, G. Vali, Z. Levin, M. D. Petters, M. Murakami, T. Leisner, U. Bundke, H. Klein, Z. A. Kanji, R. Cotton, H. Jones, S. Benz, M. Brinkmann, D. Rzesanke, H. Saathoff, M. Nicolet, A. Saito, B. Nillius, H. Bingemer, J. Abbatt, K. Ardon, E. Ganor, D. G. Georgakopoulos, and C. Saunders (2011), *Resurgence in Ice Nuclei Measurement Research*, Bull. Am. Meteorol. Soc., 92(12), 1623.

More recent developments based on continuous flow diffusion chambers may be found in the further review article by Hiranuma, N., S. Augustin-Bauditz, H. Bingemer, C. Budke, J. Curtius, A. Danielczok, K. Diehl, K. Dreischmeier, M. Ebert, F. Frank, N. Hoffmann, K. Kandler, A. Kiselev, T. Koop, T. Leisner, O. Mohler, B. Nillius, A. Peckhaus, D. Rose, S. Weinbruch, H. Wex, Y. Boose, P. J. DeMott, J. D. Hader, T. C. J. Hill, Z. A. Kanji, G. Kulkarni, E. J. T. Levin, C. S. McCluskey, M. Murakami, B. J. Murray, D. Niedermeier, M. D. Petters, D. O'Sullivan, A. Saito, G. P. Schill, T. Tajiri, M. A. Tolbert, A. Welti, T. F. Whale, T. P. Wright, and K. Yamashita (2015), *A comprehensive laboratory study on the immersion freezing behavior of illite NX particles: a comparison of 17 ice nucleation measurement techniques*, Atmos. Chem. Phys., 15(5), 2489-2518, and in the article by DeMott, P. J., Hill, T. C. J., Petters, M. D., Bertram, A. K., Tobo, Y., Mason, R. H., Suski, K. J., McCluskey, C. S., Levin, E. J. T., Schill, G. P., Boose, Y., Rauker, A. M., Miller, A. J., Zaragoza, J., Rocci, K., Rothfuss, N. E., Taylor, H. P., Hader, J. D., Chou, C., Huffman, J. A., Pöschl, U., Prenni, A. J., and Kreidenweis, S. M.: *Comparative measurements of ambient atmospheric concentrations of ice nucleating particles using multiple immersion freezing methods and a continuous flow diffusion chamber*, Atmos. Chem. Phys., 17, 11227-11245, 2017.

The continuous flow diffusion chambers described in these articles are based on the different diffusion rates of heat and water vapour between two ice-covered walls which are at different temperatures. During operation of the continuous flow diffusion chambers, a frost layer, which has the disadvantages indicated below, is thus formed on the colder wall. Over time, ice crystals can become detached from the frost layer and lead to an increasing background signal (frost artefact) in the measurement. For this reason, such apparatuses can be used at a temperature below about −20° C. only when the concentration of the ice-forming aerosol particles is significantly above this background of frost artefacts. After some hours of operation, the background signals increase to such an extent that the ice layer in the apparatus has to be renewed. However, this is a complicated procedure which cannot be carried out fully automatically. The use of such apparatuses is thus time-consuming and requires trained personnel for operation, the measurement has to be interrupted regularly for renewing the ice layer, measurements in the atmosphere are restricted to relatively low temperatures and cannot be fully automated.

In addition, methods based on collecting aerosol particles are known. These methods are characterized, especially in comparison with methods based on continuous flow diffusion chambers (CFDCs), by high sensitivity and accuracy, but averaging over a long period of time of from hours to days during which the aerosols are collected and are also restricted to temperatures above about −25° C. Furthermore, it is necessary for the aerosol samples collected to be prepared by a trained person in the laboratory, which is very time-consuming. The samples are also frequently not examined on site but firstly have to be sent to the analytical laboratory concerned, which requires a logistical outlay and additionally leads to time delays in the processing and valuation of the measurements.

GB 2 340 225 A discloses a condensation particular counter with continuous flow. Here too, diffusion of material and heat is used to generate supersaturation, to allow particles to grow by condensation and detect them optically. Here, the condensable material is firstly added to the measurement aerosol and the pseudo saturated mixture is supersaturated by cooling of walls of a tube. This measurement principle also functions for water vapour as condensate, but only for temperatures above 0° C. As soon as the walls of the tube are cooled below 0° C., firstly frost and then ice is formed on the interior surface. Frost needles can then break off and lead to background signals of ice particles. The growing ice layer can also lead to complete blocking of the tube.

U.S. Pat. No. 3,806,248 A likewise discloses a condensation particle counter with continuous flow, but here supersaturation is achieved by turbulent mixing in a cold chamber. A liquid is also present in the chamber, so that the walls are wetted or coated with frost, which can lead to background artefacts.

US 2006/0126056 A1 discloses a method and an apparatus for measuring cloud condensation nuclei (CCN) in clouds, which can be activated by controllable supersaturation of from a few tenths of a percent to a few percent. The apparatus comprises a device for providing an aerosol, a column-shaped chamber (length 360 mm, diameter 10.9 mm), which has moist walls, and a temperature control unit for generating a temperature profile along the flow direction in the chamber. However, supersaturation can be achieved only with difficulty in this chamber because a high temperature gradient in the flow direction is necessary to achieve this.

OBJECT OF THE INVENTION

Proceeding from the above, it is an object of the present invention to provide a method and apparatus for determining a concentration of aerosol particles in a carrier gas, which at least partly overcome the known disadvantages and limitations of the prior art.

The method and the apparatus should in particular allow long-term, highly maintenance-free automatic operation with high sensitivity and temporal resolution over a wide temperature and pressure range. In particular, the method and the apparatus should allow automated examination of atmospheric aerosols, preferably a simultaneous, high-resolution measurement of aerosol particles, in particular ice-forming particles, over long periods of time. In addition, the method and the apparatus should also be able to be used as aerosol particle detector in process gases or in clean air rooms, in particular at low concentrations of aerosol particles.

DISCLOSURE OF THE INVENTION

This object is achieved by a method and an apparatus for determining a concentration of aerosol particles in a carrier gas according to the features of the independent claims. Further refinements, which can be realised either individually or in any combination, are set forth in the dependent claims.

In the following, the terms "have", "encompass", "comprise" or "include" or any grammatical derivatives thereof are used in a non-exclusive manner. Accordingly, these terms can relate both to situations in which no further features are present apart from the features introduced by these terms and to situations in which one or more further features are present. For example, the expression "A has B", "A encompasses B", "A comprises B" or "A includes B" can relate both to the situation in which no further element apart from B is present in A (i.e. to a situation in which A consists exclusively of B), and to the situation in which one or more further elements, for example element C, elements C and D or even further elements, are present in addition to B in A.

Furthermore, it may be pointed out that the terms "at least one" and "one or more" and also grammatical derivatives of these terms when used in connection with one or more elements or features and are intended to express that the elements or feature can be provided one or more times, are generally used only once, for example when the feature or element is first introduced. In the case of subsequent renewed mention of the feature or element, the corresponding term "at least one" or "one or more" is generally no longer used, without this restricting the possibility that the feature or element can be provided once or a plurality of times.

Furthermore, the terms "preferably", "in particular", "for example" or similar terms are used below in conjunction with optional features without alternative embodiments being restricted thereby. Thus, features which are introduced by these terms are optional features, and it is not intended that these features restrict the scope of protection of the claims and in particular of the independent claims. Thus, the invention can, as a person skilled in the art will recognise, also be carried out using other embodiments. In a similar way, features which are introduced by "in an embodiment of the invention" or by "in a working example of the invention" are to be interpreted as optional features, without alternative embodiments or the scope of protection of the independent claims being restricted thereby. Furthermore, all possibilities for combining features introduced in this way with other features, whether optional or nonoptional features, should not be ruled out by these introductory expressions.

In a first aspect, the present invention provides a method for determining a concentration of aerosol particles in a carrier gas. The present method comprises the steps a) to d) described in detail in the following:

a) provision of an aerosol which has aerosol particles in a carrier gas comprising at least one condensable component;

b) introduction of at least part of the aerosol into a chamber of a pressure-rated vessel, wherein the chamber is delimited by at least one wall, wherein the at least one wall adjoining the chamber is set to a temperature which is above a saturation temperature of at least one condensable component;

c) subsequent removal of part of the aerosol from the chamber, as a result of which a decrease in pressure in the chamber occurs, as a result of which the at least one condensable component condenses at least partly on the aerosol particles; and d) determination of a concentration of aerosol particles in the carrier gas during removal of the part of the aerosol from the chamber.

As explained in more detail below, the steps a) to d) are preferably carried out in the order indicated, with the successive steps a) and b) and also c) and d) also being able to be carried out at least partly at the same time. In a preferred embodiment, the steps b) to d) can, in particular, be repeated a number of times so that a renewed introduction of the aerosol into the chamber as per step b) can take place after step d), with this aerosol being able to be a further part of the aerosol provided as per step a) or an aerosol freshly provided as per step a). In this way, a repeated performance, in particular a cyclic performance, of the present process can be carried out.

In a preferred embodiment, step d) but also a repeated performance of the steps b) to d) as described above can be followed by the following step e)

e) at least one-off flushing of the chamber, preferably multiflushing of the chamber, before renewed introduction of the aerosol into the chamber as per step b) is carried out in this case too, with the aerosol here being able to be a further part of the aerosol provided as per step a) or an aerosol freshly provided as per step a). The expression "flushing of the chamber" here refers to a procedure carried out for freeing the chamber of aerosol particles, for which, in particular, an aerosol-free gas, for example the carrier gas itself, is used. The concentration of the particles remaining in the chamber, in particular aerosol particles, can be reduced considerably by multiple flushing of the chamber, in particular for checking and measuring background present in the chamber. However, other types of flushing are possible.

In step a), an aerosol which has aerosol particles in a carrier gas is firstly provided. The term "aerosol" thus relates to a mixture of a carrier gas in which liquid or solid particles, here also referred to as "aerosol particles" can be introduced or be present. In particular, the aerosol can encompass liquid aerosol particles (droplets) which are formed by condensation during the present method, while solid aerosol particles (ice particles) can be obtained only for condensation nuclei which freeze at a temperature below a freezing temperature and form ice particles. The carrier gas which is designed for uptake and transport of the aerosol particles preferably comprises an inert gas or gas mixture which does not undergo any chemical reaction with the aerosol particles. When used for examining atmospheric aerosols or as aerosol particle detector in clean air rooms, the carrier gas can preferably have a gas composition which corresponds to an available atmosphere, while in the case of use as aerosol particle detector in process gases, the process gas or a gas mixture comprising the process gas, for example a process gas diluted with air from the atmosphere, represents the carrier gas. In a similar manner to the carrier gas, the aerosol particles correspond, in the case of use for examining atmospheric aerosols or as aerosol particle detector in process gases or in clean air rooms, to the aerosol particles which are already present in the available atmosphere or in the process gas fed in. However, further embodiments both in respect of the carrier gas and in respect of the aerosol particles, for example a particularly selected composition of the carrier gas and/or of the aerosol particles, are possible.

Furthermore, the carrier gas comprises at least one condensable component which is used during step c), as described in more detail there, for being at least partly condensed on the aerosol particles. Water vapour which is usually present in the atmosphere can preferably serve for this purpose. In a particularly preferred embodiment, a concentration of the at least one condensable component in the carrier gas can be set during step a) by removal or addition of part of the condensable component concerned. This procedure can also be referred to as "conditioning" of the aerosol. To set the concentration of the condensable component used in the carrier gas, it is possible to use, in particular, a device known from the prior art for reducing humidity in a carrier gas, for example a diffusion drier. As an alternative or in addition, the humidity in the carrier gas can be increased by means of a suitable device, for example a steam air humidifier. Use of further devices is possible.

In this way, a content of the condensable component concerned, for example water vapour, in the aerosol can be set in an advantageous way, and thus indirectly a saturated temperature of the at least one condensable component, which usually depends on the concentration of the at least one condensable component in the carrier gas. As further explained below, the saturation temperature plays an important role in the condensation of the condensable component on the aerosol particles. The term "saturation temperature" here refers to a temperature above which the condensable component, for example the water vapour, has a sufficient thermal energy not to condense.

In step b), at least part of the aerosol provided in step a) is introduced into a chamber of a pressure-rated vessel in order to fill the chamber provided for this purpose, which is delimited by at least one wall. Here, the aerosol provided in step a) can be passed through the chamber over a period of time, in particular so that the aerosol in the chamber has a concentration which corresponds to the concentration of the aerosol provided in step a). An apparatus which can comprise at least one pump, pump conduits and one or more valves can preferably be used for this purpose. The "vessel" here refers to a device which is configured for accommodating the aerosol, with the term "pressure-rated" indicating that the vessel is configured for withstanding a pressure exceeding atmospheric pressure without deformation. The vessel can for this purpose have at least one chamber, preferably precisely one chamber, for accommodating the aerosol, an inlet into the chamber for introducing the aerosol and an outlet from the chamber for taking off part of the aerosol. The expression "chamber" here refers to a vessel for accommodating the aerosol which has an internal volume which is delimited by at least one surface, which is usually referred to as "wall". Furthermore, the at least one wall adjoining the volume of the chamber can be brought to a temperature which can preferably be selected within wide limits.

The chamber has a length l in the flow direction of the aerosol and a maximum diameter d perpendicular to the flow direction of the aerosol, wherein the ratio of the length l to the maximum diameter d is such that $5 \geq l/d \geq 0.2$, preferably $2.5 \geq l/d \geq 0.5$, particularly preferably $1.5 \geq l/d \geq 0.75$. Herein, the chamber can preferably be configured in the form of a polyhedron or cylinder. Other types of configuration of the shape of the chamber are possible. In contrast to a column-shaped chamber, as disclosed, for example, in US 2006/0126056 A1, the chamber has a compact shape. As a result of the compact shape, the adiabatic expansion can be carried out quickly since the compact shape allows rapid removal of aerosol from the chamber and thus an advantageous quick lowering of the pressure in the chamber. In addition, the compact shape results in a small ratio of surface area of the at least one wall to the volume of the chamber and can thus contribute to the at least one wall of the chamber remaining dry and high supersaturations being able to be achieved in the volume of the chamber.

Depending on requirements and place of use, a mobile apparatus can have a volume of the chamber of from 1 l (litre) to 100 l or even more. Stationary chambers having a volume of up to 10 m³ are likewise conceivable. Depending on the chamber volume, a lower detection limit for determining the concentration of from $0.1\ l^{-1}$ to $0.001\ l^{-1}$ with a time resolution of one hour can be assumed, while similar sensitivities can be achieved in the case of the filter-based methods known from the prior art only with a time resolution of about one day or more, and the detection limit for continuous flow diffusion chambers (CFDCs) tends to be at values of $1\ l^{-1}$.

In a preferred embodiment, the vessel or an apparatus comprising the vessel for determining a concentration of aerosol particles in a carrier gas can additionally have one or more further devices selected from among:

- a heating device which is configured for increasing the temperature of the wall adjoining the chamber, for example a heating wire or a heating coil, which can preferably be installed on a surface of the wall facing away from the volume of the chamber;
- a cooling device, for example a cryostat, which is configured for reducing the temperature of the wall adjoining the chamber and which can preferably likewise be installed on a surface of the wall facing away from the volume of the chamber;
- at least one temperature sensor which is configured for determining the temperature in a subregion of the chamber or the wall adjoining the chamber, for example a thermocouple or a resistance thermometer, wherein the temperature sensor can be located on a surface of the wall facing the volume of the chamber or free in the volume of the chamber;
- a pressure sensor which is configured for determining a pressure in the chamber, for example a piezoresistive or capacitive pressure sensor, wherein the pressure sensor can preferably be located in a further outlet from the chamber.

In addition, the vessel can have one or more additional devices, preferably one or more valves, in particular at the inlet into the chamber and/or at the outlet from the chamber. Ball valves can preferably be used at the inlet into the chamber, in particular in order to avoid losses of aerosol particles during filling or flushing of the chamber. Corner valves or membrane valves can preferably be used at the outlet.

It is proposed that the at least one wall adjoining the chamber be brought, preferably before carrying out step b), to a temperature, preferably to a single temperature identical over the entire wall, which is above the saturation temperature of the at least one condensable component and to keep the wall at this temperature, particularly preferably during the entire performance of step b) and the subsequent step c) and d). Here, the expression "identical temperature over the entire wall" encompasses deviations over the surface of the wall from this value of the temperature by a value of up to 1° C., preferably up to 0.1° C., wherein the deviations are caused, in particular, by fluctuations of the temperature which occur and not as a result of a temperature distribution, in particular a temperature gradient, applied to the wall. Since, as mentioned above, the thermal energy of the condensable component, for example the water vapour, above the saturation temperature is sufficient to avoid occurrence of condensation, the condensable component, for example the water vapour, remains in a gaseous state when such a temperature is set at the wall and also, at least after a particular time interval has elapsed, in the volume of the chamber. Consequently, condensation of the condensable component, for example the water vapour, on the at least one wall of the chamber can be prevented by this setting of the temperature at the wall and thus also in the volume of the chamber. The wall of the chamber thus remains dry; occurrence of a frost layer can be prevented in this way, which leads to the advantages indicated below. Without a frost layer, ice crystals cannot form on the wall of the chamber nor become detached therefrom, so that no background signals, also referred as "frost artefacts", can occur in the measurement. Owing to the absence of frost artefacts, the present apparatus can thus be used at a temperature below 0° C. for a relatively long period of time.

After step b), part of the aerosol is, in accordance with step c) of the present method, taken from the chamber, especially through the outlet from the chamber designed for this purpose. For this, preference is given to using a pump device for taking part of the aerosol from the chamber, which device can comprise at least one pump which is configured for reducing the pressure in the chamber in a controlled manner, at least one pump conduit which is installed at the outlet from the chamber; and one or more valves. A valve located at the inlet into the chamber can preferably be closed at the same time in order to stop further inflow of aerosol into the chamber as per step b). In this way, a reduction in the pressure occurs in the chamber due to expansion of the aerosol. In particular, adiabatic cooling of the aerosol present in the chamber occurs here. The concentration of the condensable component in the chamber can here be reduced, in particular, proportionally to the pressure prevailing in the chamber. As mentioned above, the at least one wall adjoining the chamber is dry and there are thus no sources or sinks to the wall, only a sink to the pump which pumps aerosol from the chamber. Due to the adiabatic cooling, the saturation concentration or the saturation partial pressure of the condensable component can decrease virtually exponentially, which can lead to condensation of the condensable component on the aerosol particles which together with the carrier gas cool down in the chamber. The aerosol particles can thus be viewed as "cold walls" on which condensation occurs, while the walls of the chamber remain warm and dry.

The removal of part of the aerosol from the chamber is carried out in such a way that the aerosol present in the chamber cools to such an extent that the temperature goes below the saturation temperature of the at least one condensable component, as a result of which the condensable component condenses at least partly on the cold aerosol particles, which can also be referred to as "activation" of the aerosol particles. For example, condensation of water vapour on the aerosol particles present in the chamber can occur on reaching the temperature for water saturation. Since the at least one wall adjoining the chamber was brought during step b) to a temperature which is above the saturation temperature of the at least one condensable component and the temperature was reduced further by the adiabatic cooling during step c), condensation of the at least one condensable component on the at least one wall of the chamber does not occur during step c). In addition, the rate of expansion can preferably be set so that it assists the condensation of the at least one condensable component on virtually all aerosol particles present in the chamber rather than on part of the aerosol particles or on the at least one wall of the chamber. A person skilled in the art can correspondingly set the rate of expansion on the basis of his acquired knowledge and/or by means of simple tests, especially as a function of a volume of the chamber, a type, number concentration and size distribution of the aerosol particles in the chamber.

In a particularly preferred embodiment of the present process, the wall adjoining the chamber can be brought to a temperature below a freezing temperature of the at least one condensable component so that part of the previously liquid aerosol particles freezes even during step b) and a proportion of frozen aerosol particles is thereby maintained in the chamber. In a particular embodiment, in which water vapour is used as the condensable component, supercooled water droplets can be formed initially at a temperature of the wall of the chamber of from 0° C. to −35° C. However, only a small fraction of the atmospheric aerosol particles on which the water droplets have condensed generally act here as ice nucleating particles (INP) as a result of them allowing the water droplets concerned to freeze. This process can also be referred to as "immersion freezing". The water droplets which have been frozen in this way can, in particular, grow into larger ice particles as a result of thermodynamic and/or kinetic laws on lowering of the pressure in the chamber as per step c).

In a further particular embodiment in which the temperature of the wall of the chamber is set to a temperature below −35° C. during step b), some of the aerosol particles can behave as ice nucleating particles even before water saturation is attained. This process can be referred to as "deposition nucleation". Here, ice particles which can grow quickly in the ice-supersaturated environment in the chamber during step c) can also be formed.

In step d), the concentration of the aerosol particles in the carrier gas is determined during removal of part of the aerosol from the chamber. In a particularly preferred embodiment, it is possible to use a measurement device for determining a concentration of the aerosol particles in the carrier gas for this purpose, with the measurement device preferably being installed at the pump conduit which is installed at the outlet from the chamber. The measurement device for determining the concentration of the aerosol particles in the carrier gas preferably comprises an optical detector which is configured for detecting the aerosol particles in the carrier gas. This can be, in particular, an optical particle counter which, in a particular embodiment in which water vapour is used as the condensable component, measures a concentration of water droplets, which can serve as measure of the concentration of the aerosol particles in the carrier gas. To determine the concentration of the aerosol particles, it is possible, in particular, to determine a number or mass of the aerosol particles and express this as a ratio to the total volume of the aerosol discharged from the chamber. However, other types of measurement and evaluation of the measured values are possible.

As mentioned above, it is possible, in a particular embodiment in which the temperature of the wall of the chamber during step b) is set to a temperature below −35° C., for some of the aerosol particles to behave as ice nucleating particles even before water saturation is attained. These ice nucleating particles, too, which can grow quickly in the ice-supersaturated environment in the chamber during step c), can be measured by means of the measurement device for determining the concentration of the ice-forming aerosol particles in the carrier gas, in particular the optical detector.

In a particular embodiment, the optical detector can be configured for determining the activated aerosol particles as a function of their shape. This can, for example, be effected by a different type of scattering at the particles. In this way, the concentration of the liquid droplets formed by activation of virtually all aerosol particles and the ice nucleating particles can be measured independently of one another, in particular during the same measurement operation.

In summary, the method described is based, in particular, on the at least one condensable component which can condense during expansion cooling in the chamber on the aerosol particles to be detected being present virtually in the saturated range and the carrier gas having a sufficient viscosity. These properties can be attained, as suggested herein, by a combination of appropriate conditioning of the aerosol on sampling and suitable temperature regulation of the chamber to a saturation temperature of the at least one condensable component. In the temperature-regulatable chamber, which serves as expansion chamber, the aerosol particles can thus be activated by reduction of the pressure to form larger aerosol particles, for example water droplets and ice particles, and subsequently be introduced into a measurement device, in particular a suitable optical particle counter, in order to determine the concentration of the activated aerosol particles in the carrier gas.

In a further aspect, the present invention provides an apparatus for determining a concentration of aerosol particles in a carrier gas. The apparatus here comprises at least the following components:
a pressure-rated vessel for accommodating an aerosol which comprises aerosol particles in a carrier gas having at least one condensable component, wherein the vessel has at least one chamber for accommodating the aerosol, an inlet into the chamber and an outlet from the chamber and the chamber is delimited by at least one wall and the at least one wall adjoining the chamber can be set to a temperature and the chamber has a length l in the flow direction of the aerosol, wherein a ratio of the length l to a maximum diameter d of the chamber perpendicular to the flow direction is such that $5 \geq l/d \geq 0.2$, preferably $2.5 \geq l/d \geq 0.5$, particularly preferably $1.5 \geq l/d \geq 0.75$;
a pump apparatus for taking part of the aerosol from the chamber, wherein the pump apparatus has a pump conduit which is installed at the outlet from the chamber;
a measurement device for determining a concentration of the aerosol particles in the carrier gas, wherein the measurement device is installed at the pump conduit at the outlet from the chamber; and
a control unit for controlling the concentration of the at least one condensable component in the aerosol, the temperature of the at least one wall adjoining the chamber, the removal of the aerosol from the chamber and the measurement device.

The control unit which is configured for controlling the concentration of the at least one condensable component in the aerosol, the temperature of the at least one wall adjoining the chamber, the removal of the aerosol from the chamber and the measurement device can also be configured for performing further functions, in particular for controlling further pump apparatuses and/or valves, and/or for evaluating and presenting the measured values measured by means of the measurement device.

Furthermore, the apparatus can have further components, in particular one or more of the further devices described above or below.

For further details of the present apparatus, reference may be made to the description of the method of the invention.

In a further aspect, the present invention provides a computer program for carrying out, preferably in an automated manner, one, more or, preferably, all steps of the present method. The computer program can here comprise one or more algorithms for controlling the present method, in particular in a repeated, preferably cyclic, procedure. The computer program can here be provided, in particular, on a memory unit which the control unit can have. However, other types of provision of the computer program, in particular a separate data carrier or on-line access, are likewise possible.

For further details of the computer program, reference may be made to the description of the method of the invention.

The present method and the apparatus described are particularly suitable for the examination of atmospheric aerosols, in particular of ice-forming aerosol particles present therein. In this way, as described above and/or below, an automated measurement of ice nucleating particles (INP), a small but very important fraction of atmospheric aerosol, which contribute to ice formation in clouds and are therefore of critical importance for formation of precipitation in the lower troposphere and also for properties of ice clouds in the upper troposphere which are relevant to climate, can be carried out. Thus, this method and this apparatus can be used, in particular, for researching ice-forming properties of aerosol particles and continuous monitoring of atmospheric INP concentrations. Since the ice nucleating particle properties are firstly highly temperature-dependent and can differ for various particle types and secondly have a highly variable composition and concentration in space and time owing to many sources and processes, the INP concentrations can be measured by means of the present method and the apparatus described in many places and over long periods of time and thus makes it possible to obtain a complete global picture necessary for climate research and monitoring.

The present method and the apparatus described can, however, also be used as aerosol particle detector in process gases or in clean air rooms, in particular at very low concentrations, at very low or very high pressures or at very high temperatures. However, other uses of the present method and of the proposed apparatus are conceivable.

Advantages of the Invention

The present method and the proposed apparatus for determining a concentration of aerosol particles in a carrier gas has a series of advantages compared to the methods and apparatuses known from the prior art. By means of this method and this apparatus, it is possible to carry out measurements of the concentration of aerosol particles, for example of atmospheric ice nucleating particles (INP), in an automated manner with high sensitivity over a wide temperature range and with high temporal resolution. This can, in particular, be achieved by the proposed novel combination of a coolable expansion chamber, in which the aerosol particles are activated by a reduction of pressure to form water droplets and ice particles, and an optical particle counter for measuring the activated particles, with the optical particle counter preferably being installed directly in a pump conduit at the outlet from the chamber. In this way, the aerosol particles, for example the water droplets and ice particles, can be measured shortly after they have been activated in the expansion in the chamber, in particular before they are deposited, for instance by sedimentation. In addition, a large part of the aerosol particles occurring in the volume of the chamber can be detected in this way, as a result of which high sensitivity for the detection, in particular of the INP, can be achieved. In addition, a relative humidity can be reduced at the inlet for the atmospheric aerosol into the chamber to such an extent that no frost formation on a cold surface (wall) of the chamber can occur. As a result, it is made possible, in a particularly advantageous way, for the walls of the chamber to remain absolutely dry and for ice formation to occur during expansion only in the volume of the chamber. This makes it possible to avoid artefacts, for instance by means of frost needles which break off.

In summary, the present method and the proposed apparatus are characterized, in particular, by the following particularly advantageous properties:

- setting of suitable saturation conditions for the condensable component (conditioning) before introduction of the aerosol into the chamber;
- operation of the chamber with dry walls in order to ensure background-free measurements even over prolonged periods of time;
- activation of the aerosol particles to form water droplets and ice particles by controlled and rapid lowering of the pressure in the chamber;
- simultaneous activation and measurement of the water droplets and ice particles by means of a suitable optical particle counter directly in the pump conduit at the outlet from the chamber;
- high sensitivity and high time resolution for measurements over a wide temperature and pressure range; and
- partially or completely automated operation, thus use even at difficult-to-access stations and/or for long-term measurements in atmospheric measurement stations.

BRIEF DESCRIPTION OF THE FIGURES

Further details and features of the present invention can be derived from the following description of preferred working examples, in particular in conjunction with the dependent claims. Here, the respective features can be realized either alone or in a combination of a number of features with one another. However, the invention is not restricted to the working examples. The working examples are shown schematically in the following figures. Here, identical reference numerals in the figures denote identical or functionally equivalent elements or elements which correspond to one another in respect of their functions. In detail, the figures show:

DESCRIPTION OF THE WORKING EXAMPLES

Figure 1:
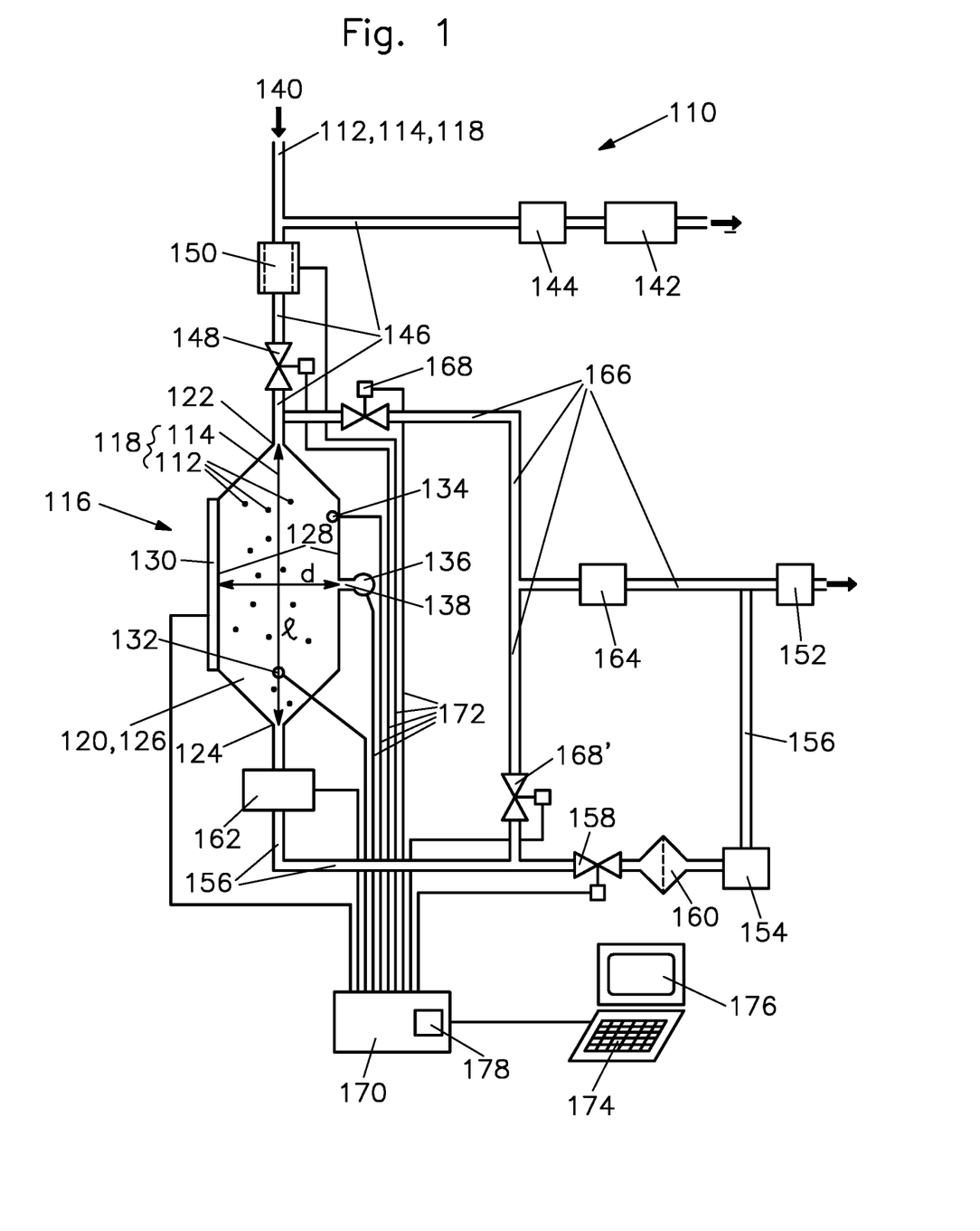
FIG. 1 a schematic depiction of a preferred embodiment of the proposed apparatus for determining a concentration of aerosol particles in a carrier gas.

FIG. 1 shows a schematic depiction of a preferred embodiment of a proposed apparatus 110 for determining a concentration of aerosol particles 112 in a carrier gas 114, wherein the carrier gas 114 comprises at least one condensable component. In a particularly preferred embodiment, atmospheric aerosol which has been taken from the earth's atmosphere or produced synthetically and which can comprise liquid particles, e.g. water droplets, or solid particles as the aerosol particles 112 and water vapour as the condensable component of the carrier gas 114 can be provided. Other types of aerosols, for instance a process gas from a chemical process or air from a clean air room, are likewise conceivable.

The apparatus 110 comprises a pressure-rated vessel 116 which is depicted in cross section in FIG. 1 and is configured for accommodating an aerosol 118 which comprises the aerosol particles 112 in the carrier gas 114 which has the at least one condensable component. The vessel 116 here comprises at least one chamber 120 for accommodating the aerosol 118, an inlet 122 into the chamber 120 and an outlet 124 from the chamber 120. The chamber 120 has a volume 126 which is delimited by at least one wall 128. The chamber 120 has a length l in the flow direction of the aerosol 118 and a maximum diameter d perpendicular to the flow direction of the aerosol 118, wherein the ratio of the length l to the maximum diameter d is such that $5 \geq l/d \geq 0.2$, preferably $2.5 \geq l/d \geq 0.5$, particularly preferably $1.5 \geq l/d \geq 0.75$. In particular, the chamber 120 can be configured in the form of a polyhedron or a cylinder; however, other shapes of the chamber 120 are possible. Thus, the chamber 120 here has a compact shape, as a result of which the chamber 120 is configured for carrying out an adiabatic expansion quickly, since the compact shape of the chamber 120 allows a preferred quick removal of part of the aerosol 118 from the chamber 120 and can thereby make an advantageous quick lowering of the pressure in the chamber 120 possible. In addition, the compact shape of the chambers 120 gives a low ratio of surface area of the at least one wall 128 to the volume 126 of the chamber 120 and can thus contribute to the at least one wall 128 of the chamber 120 remaining dry. Depending on requirements and the place of use, the chamber 120 can have, as mobile apparatus, a capacity of from 1 l (litre) to 100 l or even more; however, stationary chambers 120 having a volume of up to 10 m$^3$ are likewise conceivable.

The at least one wall 128 adjoining the chamber can here be set to a temperature, for which purpose a cooling device 130 configured for lowering the temperature of the wall 128 adjoining the chamber 120 is provided. As an alternative or in addition, a heating device (not shown) which is configured for increasing the temperature of the wall 128 adjoining the chamber 120 can also be provided for this purpose. For measuring and monitoring the temperature in particular, at least one temperature sensor 132 for determining the temperature in the chamber 120 and/or at least one temperature sensor 134 for determining the temperature in the wall 128 adjoining the chamber 120 can be provided. Furthermore, the vessel 116 can have at least one pressure sensor 136 for determining a pressure in the chamber 120, wherein the pressure sensor 136 can preferably be arranged in a further outlet 138 from the chamber 120.

The inlet 122 into the chamber 120 serves here for uptake of the aerosol 118 by the chamber 120. To introduce the aerosol 118, which can be taken as a sample 140 from a stock, into the chamber 120, it is possible to use an apparatus which can have a first pump 142, an associated first controller 144, first pump conduits 146 and a first valve 148. As also shown in FIG. 1, the apparatus 110 can have a device for setting a concentration of the condensable component, which device is, viewed in the direction of flow of the aerosol 118, arranged upstream of the inlet 122 into the chamber 120. In this way, the concentration of the at least one condensable component in the carrier gas 114 can be adjusted by removal or addition of part of the condensable component concerned. The device for setting a concentration of the condensable component in the carrier gas 114 can comprise a device for reducing a humidity in the carrier gas 114, for example a diffusion drier 150. As an alternative or in addition, a device suitable for increasing the humidity in the carrier gas 114, for example a steam air humidifier (not shown here), can be used. Use of further devices is possible. By means of this device, it is possible to set a content of the respective condensable component, for example water vapour, in the aerosol 118 and thus indirectly a saturation temperature of the at least one condensable component, which typically depends on the concentration of the at least one condensable component in the carrier gas 114 and the temperature. As mentioned above, the condensable component, for example the water vapour, cannot condense above the saturation temperature. According to the present method, it is therefore proposed that the wall 128 adjoining the chamber 120 be set to a temperature above the saturation temperature of the condensable component in the carrier gas 114, so that condensation of the at least one condensable component on the wall 128 of the chamber 120 cannot occur.

The outlet 124 from the chamber 120 and a pump apparatus provided therefor which comprises a second pump 152 for reducing the pressure in the chamber 120 in a controlled manner, an associated first controller 154, second pump conduits 156, a second valve 158 and a filter 160, which can be used for taking up the extracted aerosol particles, can serve for partial removal of the aerosol 118 from the chamber 120. The first valve 148 located at the inlet 122 into the chamber 120 can preferably be closed at the same time so as to stop further inflow of aerosol 118 into the chamber 120. A lowering of the pressure in the chamber 120 brought about in this way results in expansion of the aerosol 118 and thus adiabatic cooling of the aerosol 118 present in the chamber 120. Here, the concentration of the condensable component in the chamber 120 can preferably be reduced proportionally to the pressure prevailing in the chamber 120. Since the wall 128 adjoining the chamber 120 is dry, the saturation concentration or the saturation partial pressure of the condensable component can decrease virtually exponentially during the adiabatic cooling, which can lead to condensation of the condensable component on the aerosol particles 112 which together with the carrier gas 114 cool down in the chamber 120. As mentioned above, the aerosol particles 112 can thus be regarded as "cold walls" at which condensation occurs, while the wall 128 of the chamber 120 remains warm and dry.

The removal of part of the aerosol 118 from the chamber 120 is performed in such a way that the aerosol 118 present in the chamber 120 cools to such an extent that the saturation temperature of the at least one condensable component is reached and as a result the condensable component condenses at least partly on the aerosol particles 112. For example, when the temperature for water saturation is attained, condensation of water vapour on the aerosol particles 112 present in the chamber 120 can occur. Since the at least one wall 128 adjoining the chamber 120 has been set to a temperature above the saturation temperature of the at least one condensable component and the temperature has been lowered still further by the adiabatic cooling, the wall 128 thus remains free of condensate of the at least one condensable component.

Furthermore, the apparatus 110 has a measurement device 162 for determining a concentration of the aerosol particles 112 in the carrier gas 114, wherein the measurement device 162 is installed directly in the second pump conduit 156 at the outlet 124 from the chamber 120. In this way, the aerosol particles 112 can be measured immediately after they have been activated in the expansion in the chamber 120, in particular before they are, for instance, deposited by sedimentation in the second pump conduit 156 or in the filter 160. In addition, a large part of the aerosol particles 112 occurring in the volume 126 of the chamber 120 can be detected, as a result of which a high sensitivity for the detection thereof can be achieved.

In a particularly preferred embodiment, the measurement device 162 for determining a concentration of the aerosol particles 112 in the carrier gas 114 can be an optical detector which is designed for detecting the aerosol particles 112 in the carrier gas 114. Here, the optical detector can preferably also be designed for determining the particles as a function of their shape, for example by determining a difference in a light scattering between differently shaped particles. In this way, it can, for example, be established whether the aerosol particles 112 are present as ice nucleating particles (INP). Although the INPs generally represent only a small fraction of the atmospheric aerosol particles, a high sensitivity of the detection, in particular of the INP, can nevertheless be achieved in this way. However, other differentiation methods are possible.

Furthermore, the apparatus 110 can comprise a device for flushing the chamber 120, which can comprise a further controller 164 for access to the second pump 152, further pump conduits 166 and further valves 168, 168'. In this way, it is possible to carry out at least one or multiple flushing of the chamber 120 before renewed introduction of the aerosol 118 into the chamber 120 occurs.

Furthermore, the apparatus 110 has a control unit 170 which performs various control functions, including control of the concentration of the at least one condensable component in the aerosol 118, control of the temperature of the at least one wall adjoining the chamber 120, control of the offtake of the aerosol 118 from the chamber 120 and control of the measurement device 162. Furthermore, the control unit 170 can perform further control functions, in particular control of valves 148, 158, 168 or flushing of the chamber 120. The control unit 170 can be configured here as a separate device or be integrated into the apparatus 110, with the devices controlled in each case by the control unit 170 being able to be connected via conductive connections 172 or wirelessly (not shown here) with the control unit 170 to exercise the control functions. Furthermore, an input device, for example a keyboard 174, and/or an output device, for example a monitor 176, can be provided. However, other facilities for communication with the control unit 170 are possible. For carrying out, in particular in an automated manner, the method of the invention or one or more steps thereof, it is possible to provide a computer program which can comprise one or more algorithms for controlling the present method, in particular to give a repeated, preferably cyclic, procedure. The computer program can here be provided, in particular, on a memory unit 178 which can be introduced into the control unit 170. As an alternative or in addition, the provision of the computer program can also be effected via a separate data carrier or on-line access (not shown here).

Figure 2:
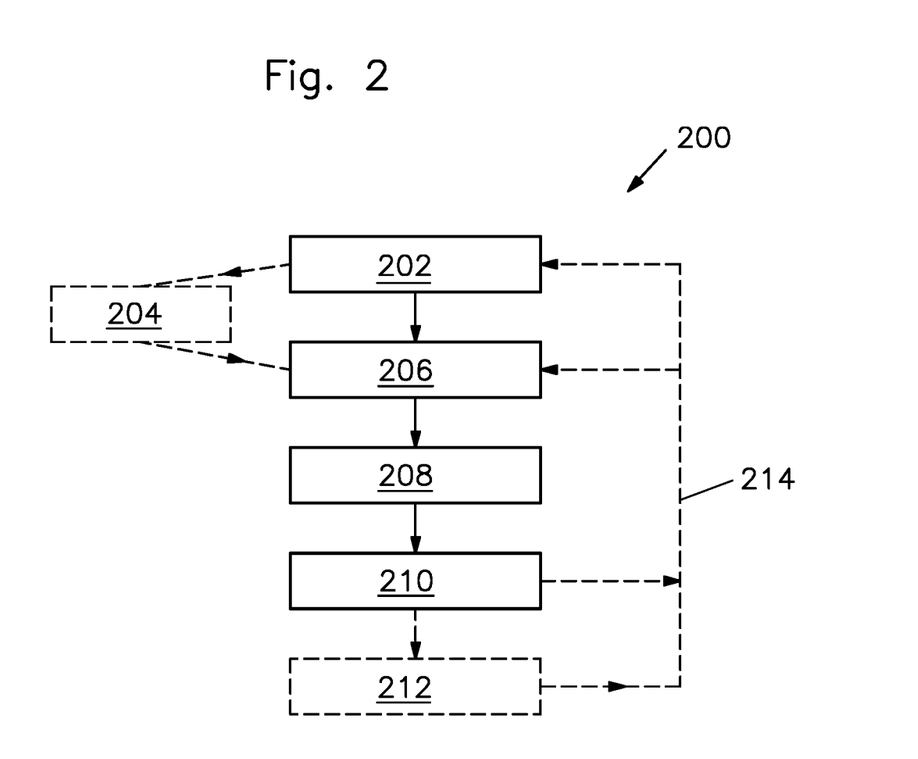
FIG. 2 a schematic depiction of a preferred embodiment of the present method for determining the concentration of aerosol particles in the carrier gas.

FIG. 2 shows a schematic depiction of a preferred embodiment of the present method 200 for determining the concentration of aerosol particles 112 in the carrier gas 114.

In a provision step 202, the aerosol 118 is provided, for example in the form of the sample 140, as per step a). The aerosol 118 here comprises the aerosol particles 112 in the carrier gas 114 which comprises the at least one condensable component. As described above, conditioning 204 of the aerosol 118 can be effected here by setting a concentration of the at least one condensable component in the carrier gas 114 by means of removal or addition of part of the condensable component concerned.

After provision of the aerosol 118 has been at least partly completed during the provision step 202, at least part of the aerosol 118 is introduced into the chamber 120 of the pressure-rated vessel 116 in a filling step 206 as per step b). The chamber 120 is delimited here by the at least one wall 128. Introduction of the aerosol 118 into the chamber 120 during the filling step 206 is carried out in such a way that the at least one wall 128 adjoining the chamber 120 is set to a temperature which is above the saturation temperature of the at least one condensable component. In this way, the at least one condensable component cannot precipitate as condensate on the wall 128 of the chamber 120.

After the filling step 206, part of the aerosol 118 is taken off from the chamber 118 in an expansion step 208 as per step c). A decrease in the pressure in the chamber 120 caused by this brings about adiabatic cooling of the aerosol 118, as a result of which the at least one condensable component precipitates at least partly as condensate on the aerosol particles 112, which can also be referred to as "activation" of the aerosol particles 112. Since the at least one wall 128 adjoining the chamber 120 has been set to a temperature above the saturation temperature of the at least one condensable component during the preceding filling step 206 and the temperature has been decreased still further by the adiabatic cooling occurring during the expansion step 208, the wall 128 can continue to remain free of the condensate of the at least one condensable component.

After activation of the aerosol particles 112 has been at least partly carried out, a measurement of the concentration of the aerosol particles 112 in the carrier gas 114 is carried out in a measurement step 210 as per step d) during the removal of part of the aerosol 118 from the chamber 120, preferably immediately after or simultaneously with the expansion step 208. As mentioned above, the measurement device 162 for determining the concentration of the aerosol particles 112 in the carrier gas 114, preferably an optical detector, in particular an optical particle counter, can be used for this purpose. To determine the concentration of the aerosol particles 112, it is possible to determine a number or a mass of the aerosol particles 112 and express this as a ratio to the total volume of the aerosol 118 discharged from the chamber 120. However, it is also possible to use other methods and apparatuses known to those skilled in the art for determining the concentration of the aerosol particles 112 here.

In a particularly preferred embodiment, one-off or preferably repeated flushing 212 of the chamber 120 as per step e) can be performed after the measurement step 210 has been carried out. The flushing 212 can preferably be carried out before a renewed filling step 206, in which the aerosol concerned can be a further part of the aerosol 118 provided in the provision step 202 or an aerosol 118 which has been freshly provided in a new provision step 202 and is optionally to be subjected to the conditioning 204. During the flushing 212, the chamber 120 is freed of aerosol particles 112, for which purpose, in particular, an aerosol-free gas, for example the carrier gas 114 itself, is used. The concentration of the particles remaining in the chamber 120, in particular of the aerosol particles 112, can preferably be reduced significantly by the multiple flushing of the chamber 120.

Particularly when the flushing 212 is performed, a repeated configuration, in particular a cyclic configuration 214, of the present method 200 can be carried out, with the filling step 206 with a further part of the aerosol provided in the provision step 202 being able to be carried out again after flushing 212. As an alternative, the provision step 202 can be performed again after flushing 212, with a fresh sample 140 of aerosol 118 being provided. However, other ways of carrying out the present method 200 are possible, preferably an embodiment in which the flushing is not carried out after each of the measurement steps 210 but only after a series of successive measurement steps 210 has been carried out.

Figure 3:
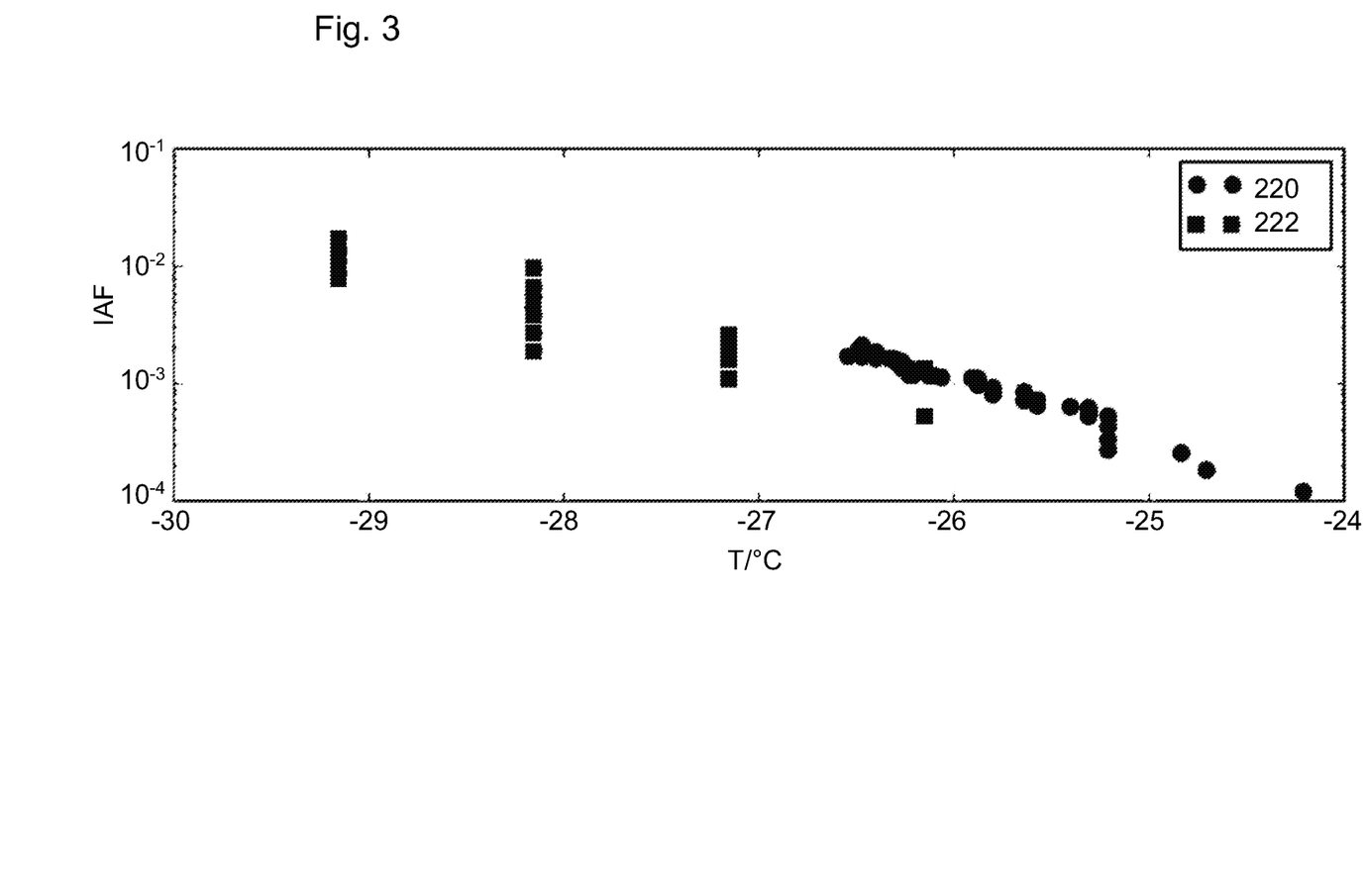
FIG. 3 a depiction of the temperature dependence on an ice-active fraction, measured using the present method and the proposed apparatus and also comparative experiments.
Figure 4:
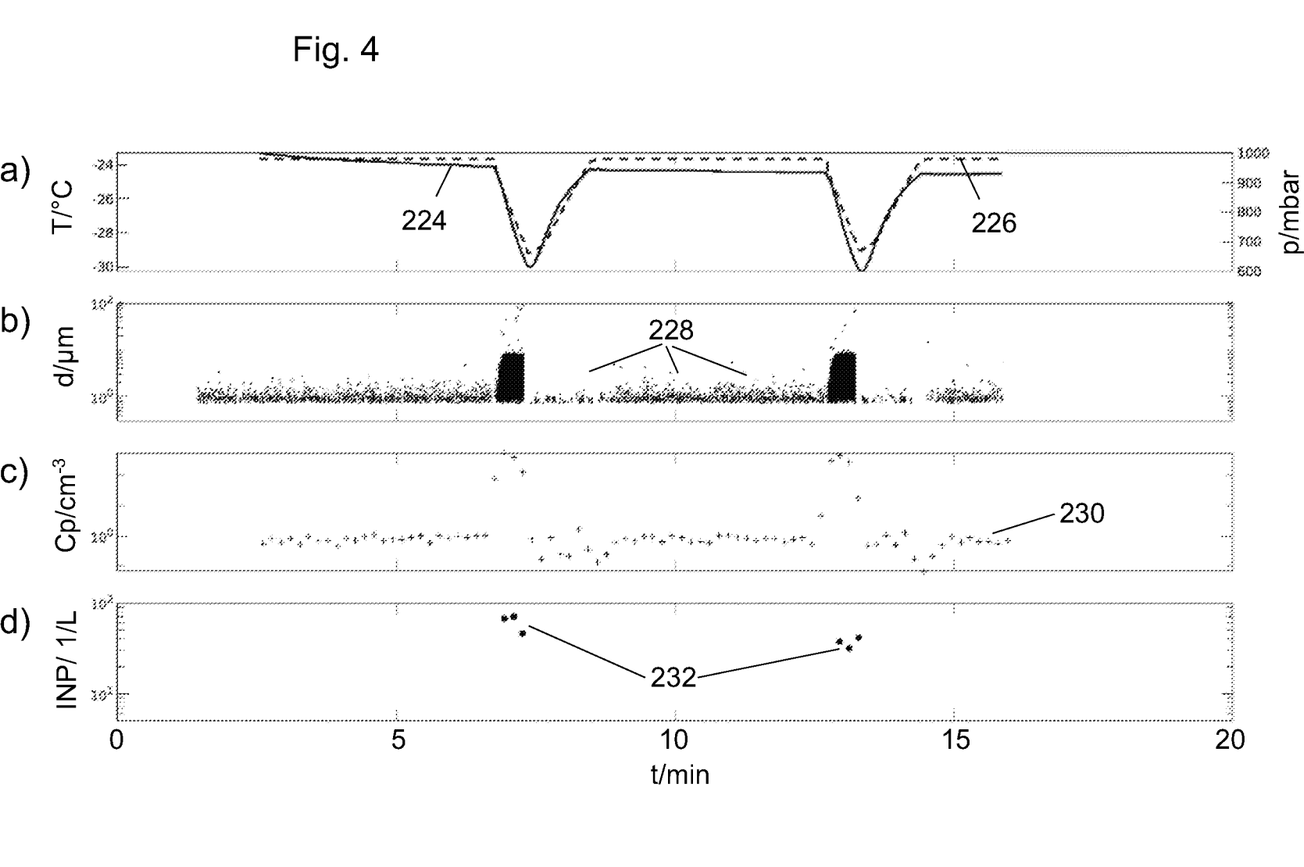
FIG. 4 a depiction of the course of various parameters over time, measured using the present method and the proposed apparatus.
Figure 5:
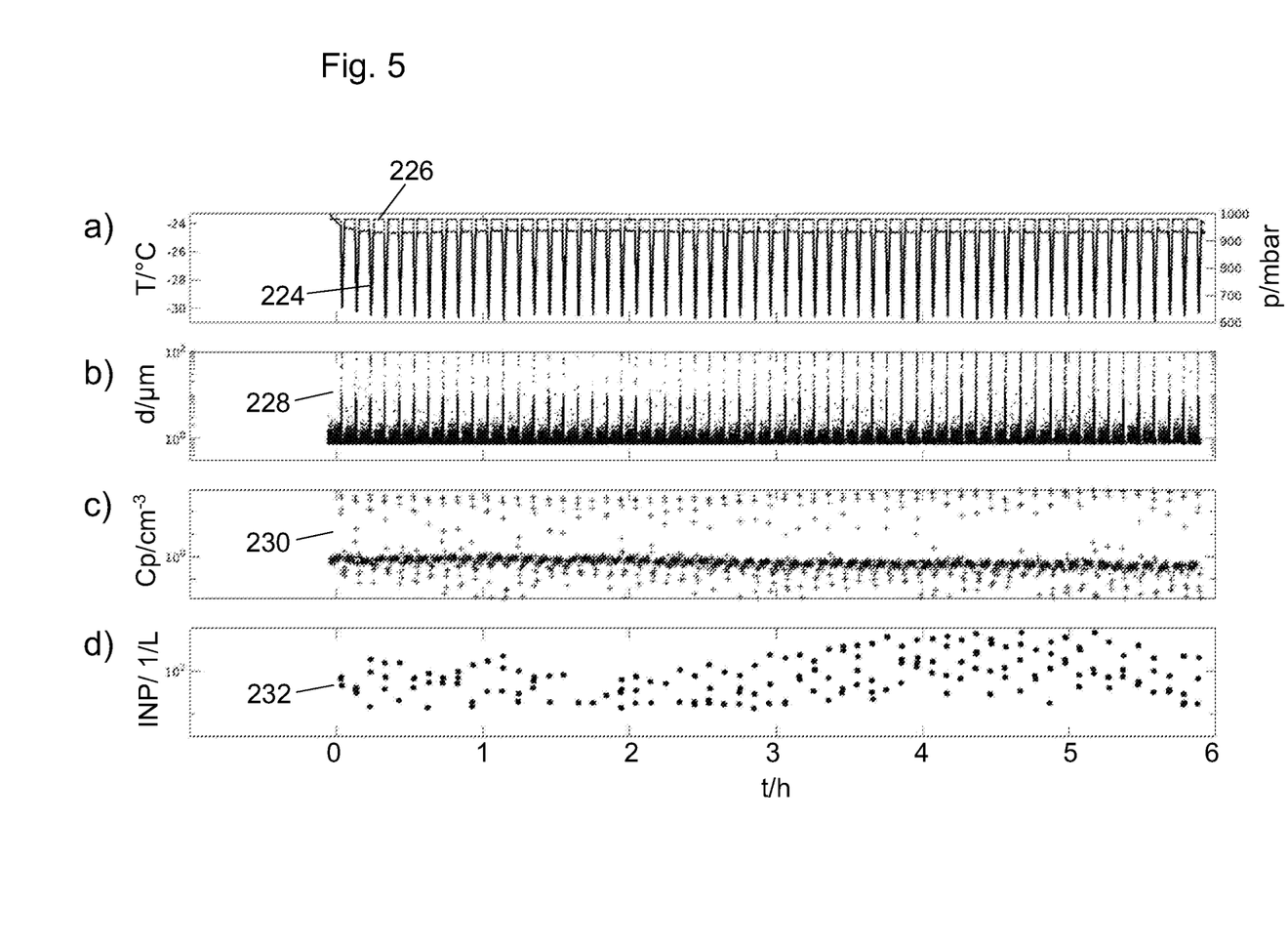
FIG. 5 a further depiction of the course over time of the parameters from FIG. 4 over a longer period of time.

FIGS. 3 to 5 show measurement results which were obtained using the present method 200 and the proposed apparatus 110.

FIG. 3 shows a first temperature dependence 220 of an ice active fraction (IAF) which was measured using the present method 200 and the proposed apparatus 110, and also, as comparative experiment, a second temperature dependence 222 for which the AIDA cloud chamber, which serves as standard for such measurements, was used. The ice active fraction IAF is given by a ratio of a measured concentration of ice particles to the total concentration of aerosol particles 112. For these measurements, the aerosol 118 was, in a first step, sprayed into the AIDA cloud chamber filled with particle-free air. Subsequently, a small part of the aerosol 118 was introduced into the chamber 120 of the present apparatus 110 and the first temperature dependence 220 was measured. The second temperature dependence 222 of the same aerosol 118 was then measured in a cloud experiment in the ADA cloud chamber. As can be seen from FIG. 3, the two temperature dependences 220, 222 obtained in different ways agree very well.

FIG. 4 shows a depiction of the course over time in t/min over a period of 20 minutes of the following parameters, which were measured using the present method 200 and the proposed apparatus 110:

- FIG. 4*a*) shows the course over time of the temperature 224 in T/° C., measured using one of the temperature sensors 134, and of the pressure 226 in p/mbar, measured using the pressure sensor 136, in the chamber 120 of the apparatus 110;
- FIG. 4*b*) shows the course over time of the data 228 recorded by an optical particle counter as the measurement device 162 for determining the concentration of the aerosol particles 112; the diameter d/μm of the aerosol particles 112 is indicated, with aerosol particles 112 having a diameter of up to a few µm, water droplets having a diameter of up to 10 µm and also large ice particles being shown;

FIG. 4c) shows the course over time 230 of the total concentration of aerosol particles 112 in $c_p/cm^{-3}$ in the chamber 120; and FIG. 4d) shows the course over time 232 of the concentration of ice nucleating particles (INP) in the chamber 120.

FIG. 5 shows a further depiction of the course over time of the parameters from FIG. 4 over a period of time t/h of a number of hours. Here, it was possible to observe an increase in the concentration 232 of INP in the chamber 120 over a number of hours, with the temperature in the chamber 120 being kept constant. The data points depicted can also be averaged.

The project leading to this application was supported by the European Research Council (ERC) as part of the research and innovation program Horizon 2020 of the EU (Financial Assistance Agreement No. 648661—Marine-Ice—ERC-2014-CoG).

LIST OF REFERENCE NUMERALS

110 Apparatus
112 Aerosol particles
114 Carrier gas
116 Vessel
118 Aerosol
120 Chamber
122 Inlet
124 Outlet
126 Volume
128 Wall
130 Cooling device
132 Temperature sensor
134 Temperature sensor
136 Pressure sensor
138 further outlet
140 Sample
142 first pump
144 first controller
146 first pump conduits
148 first valve
150 Diffusion drier
152 second pump
154 second controller
156 second pump conduits
158 second valve
160 Filter
162 Measurement device
164 further controller
166 further pump conduits
168 further valve
170 Control unit
172 Connections
174 Keyboard
176 Monitor
178 Memory unit
200 Method
202 Provision step
204 Conditioning
206 Filling step
208 Expansion step
210 Measurement step
212 Flushing
214 cyclic procedure
220 first temperature dependence
222 second temperature dependence
224 course over time of the temperature
226 course over time of the pressure
228 course over time of the data, recorded by an optical particle counter
230 course over time of the total concentration of aerosol particles
232 course over time of the concentration of ice nucleating particles (INP)

The invention claimed is:

1. A method for determining a concentration of aerosol particles in a carrier gas, comprising the steps:
    a) provision of an aerosol which has aerosol particles in a carrier gas comprising at least one condensable component;
    b) introduction of at least part of the aerosol into a chamber of a pressure-rated vessel, wherein the chamber is delimited by at least one wall, wherein the at least one wall adjoining the chamber is set to a temperature which is above a saturation temperature of at least one condensable component;
    c) subsequent removal of part of the aerosol from the chamber as a result of which a decrease in pressure in the chamber occurs, as a result of which the at least one condensable component condenses at least partly on the aerosol particles; and
    d) determination of a concentration of aerosol particles in the carrier gas during removal of the part of the aerosol from the chamber.

2. The method according to claim 1, wherein the following step e) is carried out after step d) before the introduction of the aerosol into the chamber as per step b) is carried out again:
    e) at least one-off flushing of the chamber.

3. The method according to claim 1, wherein a concentration of the at least one condensable component in the carrier gas is adjusted during step a) by removal or addition of part of the condensable component.

4. The method according to claim 1, wherein the temperature of the wall adjoining the chamber is set so that no condensation of the at least one condensable component on the wall of the chamber occurs during the steps b), c) and d).

5. The method according to claim 1, wherein the lowering of the pressure in the chamber during step c) is carried out in such a way that the condensation of the at least one condensable component occurs on the aerosol particles and not on the wall of the chamber.

6. The method according to claim 1, wherein the aerosol provided during step a) has liquid droplets as the aerosol particles and water vapour as the condensable component of the carrier gas.

7. A method for determining a concentration of aerosol particles in a carrier gas, comprising the steps:
    a) provision of an aerosol which has aerosol particles in a carrier gas comprising at least one condensable component;
    b) introduction of at least part of the aerosol into a chamber of a pressure-rated vessel, wherein the chamber is delimited by at least one wall, wherein the at least one wall adjoining the chamber is set to a temperature which is above a saturation temperature of at least one condensable component;
    c) subsequent removal of part of the aerosol from the chamber as a result of which a decrease in pressure in the chamber occurs, as a result of which the at least one condensable component condenses at least partly on the aerosol particles; and d) determination of a concentration of aerosol particles in the carrier gas during removal of the part of the aerosol from the chamber, wherein the wall adjoining the chamber is set to a temperature below a freezing temperature of the at least one condensable component, as a result of which a proportion of previously liquid aerosol particles freezes during step b) and a proportion of frozen aerosol particles is obtained thereby.

8. The method according to claim 7, wherein the determination of the concentration of the aerosol particles in the carrier gas as per step d) is carried out separately for the liquid aerosol particles and for the frozen aerosol particles, wherein a different shape of the liquid aerosol particles and of the frozen aerosol particles is taken into account.

9. An apparatus for determining a concentration of aerosol particles in a carrier gas, comprising a pressure-rated vessel for accommodating an aerosol which comprises aerosol particles in a carrier gas comprising at least one condensable component, wherein the vessel has at least one chamber for accommodating the aerosol, an inlet into the chamber and an outlet from the chamber and the chamber is delimited by at least one wall, wherein the at least one wall adjoining the chamber can be set to a temperature which is above a saturation temperature of the at least one condensable component and the chamber has a length f in the flow direction of the aerosol and a ratio of the length f to a maximum diameter d of the chamber perpendicular to the flow direction is such that $5 > f/d > 0.2$ a pump apparatus for taking part of the aerosol off from the chamber, wherein the pump apparatus has a pump conduit which is installed at the outlet from the chamber;

a measurement device for determining a concentration of the aerosol particles in the carrier gas, wherein the measurement device is installed in the pump conduit at the outlet from the chamber; and a control unit for controlling the concentration of the at least one condensable component in the aerosol, the temperature of the at least one wall adjoining the chamber, the removal of the aerosol from the chamber and the measurement device.

10. The apparatus according to claim 9, wherein the measurement device for determining a concentration of the aerosol particles in the carrier gas comprises an optical detector which is configured for detecting the aerosol particles in the carrier gas.

11. The apparatus according to claim 10, wherein the optical detector is also configured for determining the aerosol particles as a function of their shape.

12. The apparatus according to claim 9, further comprising at least one element selected from among a device for setting a concentration of the condensable component, wherein the device is arranged upstream of the inlet into the chamber;

a heating device for increasing the temperature of the wall adjoining the chamber;

a cooling device for reducing the temperature of the wall adjoining the chamber;

at least one temperature sensor for determining the temperature in the chamber or of the wall adjoining the chamber;

a pressure sensor for determining a pressure in the chamber.

* * * * *

UNITED STATES PATENT AND TRADEMARK OFFICE
CERTIFICATE OF CORRECTION

PATENT NO. : 11,474,019 B2
APPLICATION NO. : 16/448229
DATED : October 18, 2022
INVENTOR(S) : Ottmar Moehler It is certified that error appears in the above-identified patent and that said Letters Patent is hereby corrected as shown below:

On the Title Page

Item (30), insert:
--Foreign Application Priority Data
Jun. 28, 2018 (DE) .......................10 2018 210 643.6--

Signed and Sealed this
Thirteenth Day of December, 2022

Katherine Kelly Vidal
*Director of the United States Patent and Trademark Office*